Figure 1:
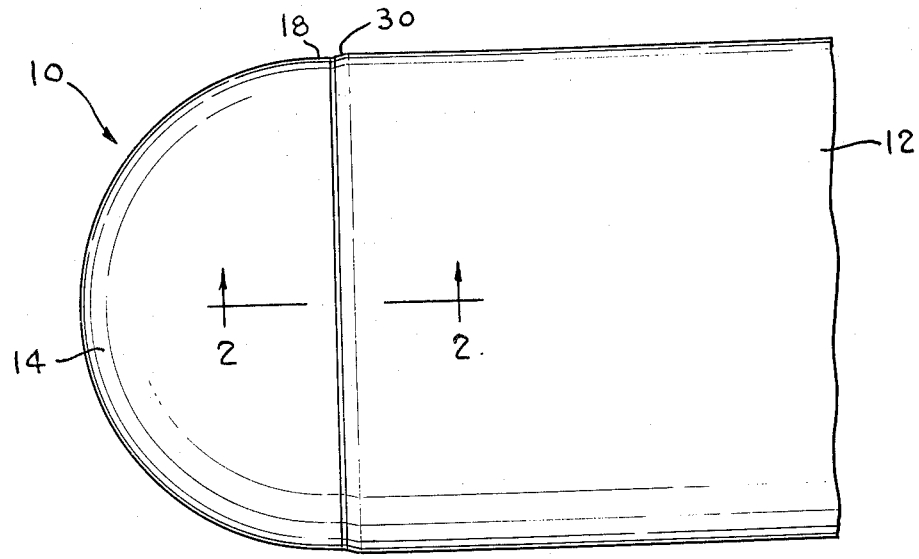

April 19, 1966     R. E. MARSHALL     3,246,794
PRESSURE VESSEL BUTT JOINT AND METHOD OF MAKING SAME
Filed April 8, 1964

INVENTOR
ROLLAND E. MARSHALL
BY
ATTORNEY

United States Patent Office 3,246,794
Patented Apr. 19, 1966

3,246,794
PRESSURE VESSEL BUTT JOINT AND METHOD OF MAKING SAME
Rolland E. Marshall, Milwaukee, Wis., assignor to Pressed Steel Tank Company, Milwaukee, Wis., a corporation of Wisconsin
Filed Apr. 8, 1964, Ser. No. 358,253
17 Claims. (Cl. 220—67)

This invention relates to weld joints and, more particularly, to weld joints between sections of unequal thickness and the method of making such joints.

It is well known that various configurations exhibit different pressure characteristics, e.g. a hemispherical shape can withstand greater pressures than a cylindrical or flat shape or, conversely, a thinner hemispherical section will withstand the same pressure as a thicker cylindrical or flat section. In certain constructions, this characteristic could be taken advantage of to effect a savings in material. For example, in a vessel having a cylindrical body with closed ends, a hemispherically shaped head could be utilized to close the ends of the vessel and could have a thinner wall section than the cylindrical body. However, in the fabrication of pressure vessels certain ASME specifications and minimum requirements must be adhered to. One such specification is that where sections of unequal thickness are butt joined and where the difference in thickness between sections is more than one-fourth of the thickness of the thinner section, or is more than one-eighth of an inch, a taper must be provided. The length of the taper must not be less than four times the difference in thickness, or offset, between the two sections. Accordingly, joining sections of unequal thickness in the past has generally required a grinding or similar machining operation to provide the taper. The cost of such machining operations has usually canceled out any savings which might have been effected from the use of a thinner section head and has made the use of sections of different thicknesses impractical in all but the larger vessels where the savings effected by less material is large enough to outweigh the cost of the machine operation.

Accordingly, a general object of this invention is to provide an improved joint between sections of unequal thickness and, furthermore, to improve and reduce the cost involved in the method of forming the joint.

For the achievement of these and other objects of this invention, a method is proposed wherein an end of the thicker of the two sections is prepared by offsetting a portion thereof to provide a butt surface for the weld joint and is also deformed, rather than machined, to include a tapered surface at the butt joint. A joint between sections of unequal thickness can then be made to meet ASME specifications without any machining operations. This method and the joint formed thereby possess the additional advantage that the formed offset also provides a backing ring for the thinner sections to thereby afford reinforcing at the joint.

Figure 2:
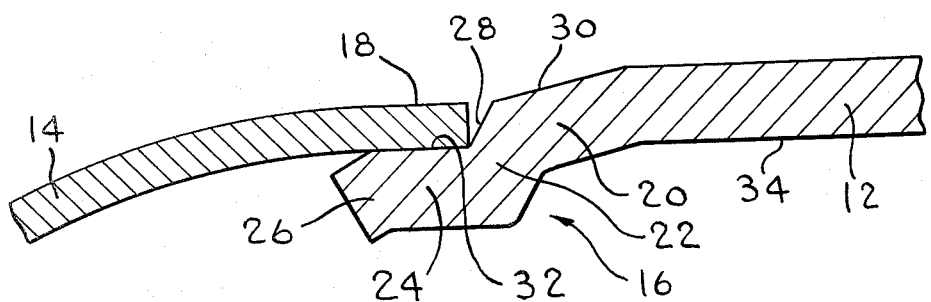

The novel features of this invention are set forth in the appended claims. The invention itself, together with additional objects and advantages thereof, will be more clearly understood from a reading of the following description in connection with the accompanying drawings wherein a preferred embodiment of the invention is illustrated and in which:

FIG. 1 illustrates a portion of a pressure vessel including a joint formed in accordance with this invention; and FIG. 2 is an enlarged section view taken generally along line 2—2 of FIG. 1.

With particular reference to the drawings, the joint constructed in accordance with this invention is illustrated as incorporated in a pressure vessel 10 which includes cylindrical body portion 12 and hemispherical head portion 14 closing one end of the body; however, it will be appreciated that this invention has application to other types of vessels and, therefore, is not intended to be restricted to any one particular vessel configuration.

The joint between body 12 and head 14 is better illustrated in FIG. 2 where it can also be seen that head 14 is thinner than body 12. End 16 of body 12 is formed to provide an offset for receipt of end 18 of the hemispherical head and also provide a taper at the joint which meets the requirements of ASME specifications. More particularly, end 16 is deformed to include an angular portion 20 which terminates in a portion 22 disposed at a sharper angle to the general cylindrical line of vessel 12 than portion 20. From portion 22, end 16 continues in a portion 24 which extends generally parallel to the wall of body 12 and terminates in an angularly disposed portion 26. Portion 26 is provided to prevent interference between end 16 and end 18 of the hemispherical head.

When so formed, portion 24 is offset radially from the general cylindrical line of body 12, preferably to a point where it is aligned with the inner wall 34 of body 12, and provides a surface 32 for receipt of end 18 of the head. Angular portion 20 provides a gradually tapered surface 30, and portion 22 connects offset portion 24 and portion 20 and also provides a butt surface 28 which cooperates with end 18 in forming a butt joint.

End 16 can be deformed in any suitable manner. For example, the end could be rolled by a suitably formed tool which would form portions 20, 22, 24 and 26 in a single operation or, the end could be formed in two or more operations, for example, a first operation which would form end 16 with an outer surface disposed at an angle corresponding to the angle of portion 30 and then that portion formed by offsetting it to provide surfaces 28 and 32. In either instance, the length of surface 30 can be varied as required to provide the requisite taper at the butt joint to meet minimum ASME requirements without any machining operation. The length of taper portion 30 can vary depending on the thickness of the sections to be joined and as determined by the formula discussed above, i.e. a taper portion is provided in body 12 at the butt weld joint having a length at least four times the difference in thickness of the sections.

As will be noted in the drawings, an additional advantage of forming a joint in this manner is that portion 24 provides an integral backing ring for end 18 of the head to thereby reinforce the butt weld joint. The offset, in addition to positioning surface 32 in alignment with surface 34, also preferably aligns the outer surface of head 14 with the lowermost portion of taper 30. With the head 14 arranged in abutting relationship with surface 28 a weld can be made between the body and the joint. No machining operations are required in joining the head and body except whatever operations are necessary to dress the weld joint.

The joint provided by this invention resembles what is commonly referred to in the art as a "joggle" joint in that one section is offset to receive the other. However, it differs from the joggle joint in that it includes a formed taper at the point of the butt weld, whereas, a "joggle" joint formed in accordance with heretofore accepted procedures would offset end 16 to a depth necessary to align the inner surface of head 14 with the inner surface of the body vessel 12 and the outer surface of the body would then have to be ground, or otherwise suitably machined, to provide the required taper at the joint. Thus, "joggle" joints formed in accordance with heretofore accepted procedures require a machining operation to meet ASME specifications. Therefore, although the joint of this invention resembles a "joggle" joint, it actually constitutes an improvement over the common "joggle"

joint in that it incorporates a deformed taper which meets ASME specifications.

Although but one embodiment of the present invention has been illustrated and described, it will be apparent to those skilled in the art that various changes and modifications may be made therein without departing from the spirit of the invention or from the scope of the appended claims.

What I claim is:

1. A joint between sections of different thicknesses characterized in that an end of the thicker of said sections includes
    a portion offset from the line of the remainder of said thicker section,
    a deformed taper portion disposed inwardly of said offset portion and extending at an angle to said line, said taper portion having a prescribed length determined by the difference in thickness between said sections,
    a connecting portion extending between said offset and taper portions and disposed generally transversely of said taper portion to provide a butt surface, said thinner section arranged with its end facing said connecting portion,
    and means forming a fused connection between the ends of said thinner section and said connecting portion.

2. Pressure vessel joint between a hollow elongated member and a head member adapted to close an end of said hollow member, said joint characterized in that the head receiving end of said hollow member includes,
    a portion at said head receiving end offset laterally of said hollow member in a direction transversely of the longitudinal axis of said hollow member,
    a deformed angular portion spaced inwardly of said offset portion and having a prescribed length determined by the difference in thickness between said hollow member and said head,
    a connecting portion extending between said offset and angular portions and disposed transversely of the longitudinal axis of said hollow member, and said head is arranged with its ends engaged with said offset portion and facing said connecting portion,
    and a weld joint between said head and said connecting portion.

3. A joggle joint between sections of unequal thickness wherein the thicker of said sections includes a joggle portion comprising a taper portion, an offset portion and a butt surface extending between and connecting said taper and offset portions, said joggle characterized in that said taper portion is deformed and extends from the butt surface a prescribed distance determined by the difference in thicknesses between said sections, and a weld between the end of the thinner section and the butt surface.

4. A pressure vessel joint between sections of different thicknesses characterized in that an end of the thicker of said sections includes
    a portion offset from the line of the remainder of said thicker section,
    a deformed taper portion disposed inwardly of said offset portion and extending at an angle to said line, said taper portion having a prescribed length determined by the difference in thickness between said sections,
    a connecting portion extending between said offset and taper portions and disposed generally transversely of said taper portion to provide a butt surface, the lateral extension of said connecting portion being substantially equal to the thinner of said section,
    said thinner sections arranged on said end of said thicker section with an end thereof facing said connecting portion,
    and means forming a fused connection between said end of said thinner section and said connecting portion.

5. A pressure vessel joint between a hollow elongated member and a head adapted to close an end of said hollow member, said joint characterized in that the head receiving end of said hollow member includes,
    a portion at said head receiving end offset laterally of said hollow member in a direction transversely of the longitudinal axis of said hollow member,
    a deformed angular portion spaced axially inwardly of said offset portion and having a prescribed length determined by the difference in thickness between said hollow member and said head and characterized by a uniform thickness throughout its extension,
    a connecting portion extending between said offset and angular portion and disposed transversely to the longitudinal axis of said hollow member and to said angular portion,
    said head arranged on said head receiving end of said hollow member with the end of said head facing said connecting portion,
    and a weld joint between said end of said head and said connecting portion.

6. A pressure vessel joint between a generally cylindrical body and a generally hemispherical head having a thickness which is less than that of said cylindrical body, said body including
    a portion at one end thereof offset radially inwardly from the remainder of said body,
    an angular portion spaced axially inwardly of said offset portion and having a prescribed length determined by the difference in thickness between said body and head and characterized by a uniform thickness throughout its extension,
    a connecting portion extending between said offset and angular portions and disposed transversely of the axis of said body and to said angular portion, said connecting portion characterized by an extension in a radial direction which is substantially equal to the thickness of the thinner of said sections,
    said head arranged with its open end in engagement with said offset portion and facing said connecting portion,
    and a weld joint between the end of said head and said connecting portion.

7. In the method of forming a joint between sections of unequal thickness, the improvement of deforming an end of the thicker of said sections by
    offsetting a portion adjacent said end laterally from the general line of said thicker section,
    deforming a taper portion inwardly of said laterally offset portion and at an angle to said line of said thicker section, said taper portion having a prescribed length determined by the difference in thickness between said sections,
    deforming a portion between said offset and taper portions to extend at an angle to said taper portion and generally transversely of said line to provide a butt surface connecting said offset and taper portions,
    positioning the thinner section with an end thereof facing said butt surface,
    and fusing said thinner section to said butt surface.

8. In the method of forming a pressure joint between sections of unequal thickness, the improvement of deforming an end of the thicker of said sections by
    deforming an angular portion having a prescribed length determined by the difference in thickness between said sections,
    offsetting a portion laterally from said angular portion and between said angular portion and the terminal portion of said end of said thicker section,
    deforming a portion between said offset and angular portions to extend at an angle to said angular portion and generally transversely of said offset portion to provide a butt surface connecting said offset and angular portions,
    positioning the thinner section with an end thereof facing said butt surface, and fusing said thinner section to said butt surface.

9. In the method of forming a joint between sections of a pressure vessel having unequal thickness, the improvement of
  offsetting a portion adjacent an end of the thicker of said sections laterally from the general line of said thicker section and extending generally parallel to said line,
  deforming an angular portion inwardly of said laterally offset portion and at an angle to said line, said angular portion having a prescribed length determined by the difference in thickness between said sections,
  providing a butt surface by deforming a portion between said offset and angular portions to extend at an angle to said angular portion generally transversely of said line and having a lateral extension from said offset portion substantially equal to the thickness of the thinner of said sections,
  positioning the thinner of said sections at said end in abutting relationship with said butt surface and on said offset portion,
  and welding said end of said thinner section to said butt surface.

10. In the method of fabricating a vessel, the improvement in the method of attaching a head portion to a generally cylindrical portion of thicker cross-section than said head portion of deforming the head receiving end of said thicker portion by
  deforming an angular portion adjacent to and spaced inwardly of the terminal portion of said head receiving end and extending a prescribed distance determined by the difference in thickness of said head and cylindrical portions,
  offsetting a portion of said head receiving end laterally from said angular portion and between said angular portion and said terminal portion of said head receiving end,
  providing a butt surface by deforming a portion between said offset and angular portions to extend at an angle to said angular portion generally transversely of said offset portion and having a radial extension generally equal to the thickness of said head portion,
  positioning the head portion on said head receiving end in abutting relationship with said butt surface,
  and welding the end of said head portion to said butt surface.

11. In the method of joining a hemispherical head portion to an elongated generally cylindrical body portion having a thickness which is greater than said head portion, the improvement of deforming the periphery of the head receiving end of said body portion by
  deforming a portion at an angle to the longitudinal axis of said elongated body portion adjacent to but spaced inwardly of the terminal portion of said head receiving end, said angular portion having a prescribed length determined by the difference in thickness between said head and body portions,
  laterally offsetting a portion of said head receiving end transversely of said axis and at a point spaced axially outwardly of said angular portion,
  deforming a portion between said offset and angular portions to extend at an angle to said angular portion and generally transversely of said offset portion to provide a butt surface connecting said offset and angular portions,
  positioning said head portion with its end facing said butt surface,
  and welding said head portion end to said butt surface.

12. The method of claim 11 wherein said offset portion extends generally parallel to said axis and wherein said head portion is received on and is in engagement with said offset portion.

13. The method of claim 12 wherein said offset portion is offset in alignment with the inner wall of said body portion.

14. In the method of fabricating a pressure vessel having a generally elongated body portion and a generally hemispherical head portion closing an end of said body portion and wherein the thickness of said body portion is greater than the thickness of said head portion, the improvement in the formation of the joint betwen said body and head portions of deforming the head receiving end of said body portion by
  at said head receiving end offsetting a portion of said end laterally with respect to the longitudinal axis of said body to form a generally elongated surface parallel to said axis,
  axially inwardly of said offset portion deforming an angular portion having a prescribed length determined by the difference in thickness of said body and head portions,
  deforming a portion between said offset and angular portions to extend at an angle to said angular portion and generally transversely of said offset portion to provide a butt surface connecting said offset and angular portions,
  positioning said head portion in engagement with said offset portion and in abutting relationship with said butt surface,
  and welding said head portion to said head receiving end.

15. The method of claim 14 wherein said offset portion is offset inwardly of said body portion in alignment with the inner wall of said body portion.

16. The method of claim 15 wherein said head receiving end is rolled to form said offset, angular and connecting portions.

17. In the method of fabricating a pressure vessel having a cylindrical body portion and a hemispherical head portion closing an end of said body portion and wherein the thickness of said body portion is greater than the thickness of said head portion, the improvement in the formation of a joint between said body and head portions of
  deforming a first portion at and spaced inwardly of the terminal portion of the head receiving end of said body portion and at an angle to the walls of said body portion, said angular portion having a prescribed length determined by the difference in thickness of said body and head portions,
  deforming a generally cylindrical portion at the terminal portion of said head receiving end and offset radially inwardly of said angular portion,
  providing a butt surface by deforming a portion between said cylindrical portion and said angular portion to extend axially of said angular portion, generally transversely of said cylindrical portion and having a radial extension substantially equal to the thickness of said head portion and connecting said cylindrical and angular portions,
  positioning said head portion on said head receiving end in engagement with said cylindrical portion and in abutting relationship with said butt surface,
  and welding said head portion to said head receiving end.

References Cited by the Examiner

UNITED STATES PATENTS

| | | | |
|---|---|---|---|
| 2,271,652 | 2/1942 | Langvand et al. | |
| 2,366,617 | 1/1945 | Harris | 220—3 |
| 2,551,484 | 5/1951 | Branning | 29—483 XR |
| 2,612,857 | 10/1952 | Jones | 29—482 XR |
| 2,758,367 | 8/1956 | Dougherty | 29—483 XR |

FOREIGN PATENTS

| | | |
|---|---|---|
| 888,771 | 2/1962 | Great Britain. |

WHITMORE A. WILTZ, *Primary Examiner.*